Nov. 7, 1972   M. W. LOVELAND   3,702,144
ORIFICE STRUCTURE HAVING TWO DIFFERENT FLOW RATES
Filed Oct. 6, 1970

INVENTOR.
MALCOLM W. LOVELAND
BY
*Eensoff & Hoffle*
ATTORNEYS

United States Patent Office 3,702,144
Patented Nov. 7, 1972

3,702,144
ORIFICE STRUCTURE HAVING TWO
DIFFERENT FLOW RATES
Malcolm W. Loveland, Orinda, Calif., assignor to
Atlas Pacific Engineering Company
Filed Oct. 6, 1970, Ser. No. 78,502
Int. Cl. F15d 1/02
U.S. Cl. 138—44                                    1 Claim

ABSTRACT OF THE DISCLOSURE

This invention relates to a novel form of orifice structure providing a high rate of flow in one direction and a reduced rate of flow in the opposite direction under the same conditions.

BACKGROUND OF THE INVENTION

Such an orifice structure is useful in devices such as shock absorbers, peeling devices, railway car couplers, door checks and like devices which require an easy flow in one direction and a restricted flow in the opposite direction. Further, in Pat. 3,277,941 there was disclosed a fluid dampening mechanism utilizing fluid pressure for controlling the reluctance of movement of a peeling mechanism. As disclosed in that patent, an orifice structure designated as 66 was included to control the rate of fluid flow as the peeling mechanism moved toward and away from the fruit being peeled. The orifice in the structure 66 was a passage of uniform diameter which provided essentially the same reluctance to flow in both directions.

I have now discovered that by providing an orifice structure having different rates of flow depending upon the direction of movement of the fluid, one can provide a more successful peeling structure or other such structure. More particularly, when the orifice of the present invention is employed in the structure of the aforesaid patent, it provides a reduced reluctance to the movement of the cutter mechanism toward the fruit and a great reluctance to movement of the cutter mechanism away from the fruit. This is highly desirable because if the cutter moves so readily that it is thrown out of contact with the fruit by the passage of an irregularity on the surface of the fruit, then unpeeled areas will be left on the fruit. It is desirable that the cutter follow the fruit closely, hence the cutter should have a high reluctance to leave the fruit and a small reluctance to returning into engagement with the fruit.

SUMMARY OF THE INVENTION

It is in general the broad object of the present invention to provide an improved and novel form of orifice structure which provides two different flow rates under the same conditions.

BRIEF DESCRIPTION OF THE PREFERRED ORIFICE EMBODIMENT

Figure 1:
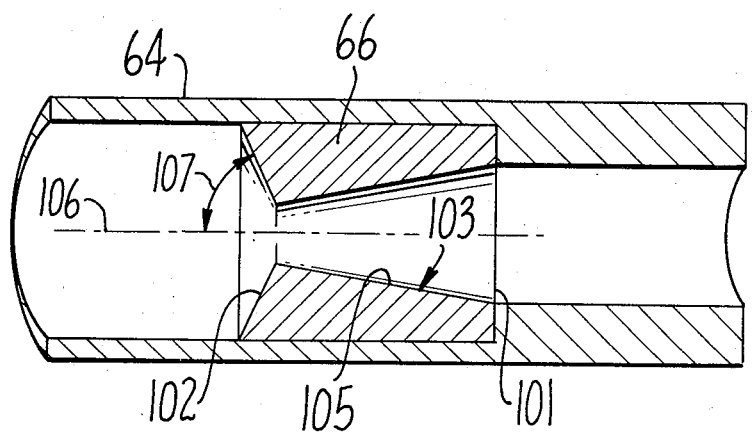
FIGS. 1 and 2 are each cross sections through two forms of the orifice of this invention.

Referring to the drawings, the plug or body 66, as shown in the aforementioned patent, is secured in the fluid line 64. The plug or body 66 has a first face 101 and a second face 102 with a passage, generally indicated at 103, extending through the body from one face to the other along the axis 106. In the form shown in FIG. 1, the passage 103 extends to and blends smoothly with the fluid passage in line 64 while in the form shown in FIG. 2 the passage in fluid line 64 is of a larger diameter. It is therefore desirable to provide the passage 103 with a well rounded entrance 104 leading into the convergent portion 105. The well rounded entrance portion is provided to ensure that the flow of fluid into the convergent portion 105 begins smoothly. The convergent portion 105 reduces the flow from the first face to the second face to such diameter as is required to provide the proper flow in the system. The discharge coefficient of the convergent portion is high, as is well-known, so there is a minimum of resistance to the passage of fluid from the first face 101 to the second face 102. An angle of the convergent passage of 10° to 20° works very well for water as the fluid.

Figure 2:
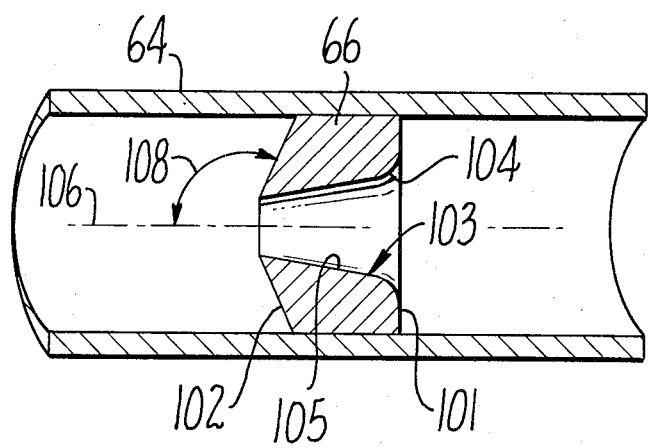

The second face 102 of the body 66 has an angular relationship to the axis which may be obtuse, as shown by the arc 108 in FIG. 2, or acute, as shown by the arc 107 in FIG. 1, depending on the requirements of the system. At a small acute angle, the coefficient of discharge is relatively high, signifying a low resistance to flow from the second face to the first face. As the angle becomes obtuse, the flow characteristics approach that of a Borda's mouthpiece which has a low discharge coefficient or a high resistance to flow. The included angle of the convergent portion 105 should be such that the flow from the second face to the first face is able to spring free from the side walls of the portion 105 which are divergent in the direction of flow when the flow is from face 102 to face 101 and so retain the low coefficient of the sharp edge orifice. If the flow is allowed to follow the divergent sides, it can produce a higher discharge coefficient.

The whole intent is to produce a high coefficient of discharge in flow in the direction from the first face to the second face and a lower coefficient in the opposite direction. By varying the latter coefficient, various flow ratios can be produced. The following table shows the ratio of the rates of flow for different angles of the second face to the axis 106 with an angle of 20° for the convergent portion. These rates were measured by passing a fixed volume of water through the orifice at a fixed range of head for each angular change for both forward and reverse flows and the times noted for the flow of the fixed volume of water. It will be observed that when the value of the angle of the second face to the axis 106 is 70°, the ratio of flow is 1.0 whereas as the angle of the second face to the axis 106 is increased, it finally attains a value of 1.45.

TABLE

| Angle to axis, 106 in degrees: | Ratio $V/V_1$ |
|---|---|
| 70 | 1.00 |
| 75 | 1.05 |
| 80 | 1.15 |
| 90 | 1.30 |
| 100 | 1.35 |
| 110 | 1.40 |
| 120 | 1.40 |
| 130 | 1.42 |
| 140 | 1.45 |
| 150 | 1.45 | in the table, V is the rate of flow from the face 101 toward face 102 and $V_1$ is the rate of flow from the face 102 toward face 101.

Obviously, many modifications and variations of this invention may be made without departing from the spirit and scope thereof, and other fluids, heads or orifice size may alter the ratios so obtained. Therefore, only such limitations should be imposed as are indicated in the appended claim.

I claim:
1. An orifice device for use in a fluid line to provide one rate of flow of fluid in one direction and a different rate of flow of fluid in direction opposite to the one direction and under the same conditions, said orifice device comprising a body for placement in the fluid line and having a first, planar face and a second face on opposite ends thereof, a convergent flow passage having an included angle of about 20 degrees and extending axially through the body and converging inwardly from the first face through the second face and having a diameter at the first face less than the internal diameter of the fluid line, the entrance of the convergent passage in the first face being rounded, the second face extending outwardly to the wall of the fluid line at an angle relative to the axis of the body of greater than 90 degrees to achieve a predetermined flow rate, the angle of the second face to the axis being such that the ratio of the rate of flow in the direction from the first face to the second face to the rate of flow in the direction from the second face to the first face is greater than 1.

References Cited
UNITED STATES PATENTS

| | | | |
|---|---|---|---|
| 2,694,296 | 11/1954 | Prosek et al. | 62—511 X |
| 1,675,349 | 7/1928 | Heginbottom et al. | 138—44 X |
| 1,850,030 | 3/1932 | Pardoe | 138—44 X |
| 3,041,980 | 7/1962 | Behrens | 138—44 X |

EDWARD J. EARLS, Primary Examiner